(12) United States Patent
Stogaitis et al.

(10) Patent No.: US 9,100,778 B2
(45) Date of Patent: Aug. 4, 2015

(54) DETERMINING A WIFI SCAN LOCATION

(71) Applicant: Google Inc., Mountain View, CA (US)

(72) Inventors: Marc Stogaitis, San Mateo, CA (US); Zhentao Sun, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 224 days.

(21) Appl. No.: 13/675,881

(22) Filed: Nov. 13, 2012

(65) Prior Publication Data

US 2015/0172854 A1 Jun. 18, 2015

(51) Int. Cl.
*H04W 64/00* (2009.01)
*H04W 4/02* (2009.01)

(52) U.S. Cl.
CPC .............. *H04W 4/02* (2013.01); *H04W 64/003* (2013.01)

(58) Field of Classification Search
None
See application file for complete search history.

(56) References Cited

U.S. PATENT DOCUMENTS

| | | | |
|---|---|---|---|
| 2004/0033808 A1* | 2/2004 | Rorabaugh | 455/456.1 |
| 2006/0095349 A1* | 5/2006 | Morgan et al. | 705/29 |
| 2007/0005363 A1* | 1/2007 | Cucerzan et al. | 704/256 |
| 2007/0121560 A1* | 5/2007 | Edge | 370/338 |
| 2012/0184292 A1* | 7/2012 | Lin et al. | 455/456.1 |
| 2012/0253665 A1* | 10/2012 | Forstall et al. | 701/450 |
| 2012/0303271 A1* | 11/2012 | Chowdhary et al. | 701/433 |
| 2013/0023282 A1* | 1/2013 | Lin et al. | 455/456.1 |
| 2013/0110454 A1* | 5/2013 | Sidhu et al. | 702/150 |
| 2013/0130725 A1* | 5/2013 | Forutanpour et al. | 455/456.6 |
| 2013/0143590 A1* | 6/2013 | Sridhara et al. | 455/456.1 |
| 2013/0331113 A1* | 12/2013 | Grosman et al. | 455/452.1 |

* cited by examiner

*Primary Examiner* — Ayaz Sheikh
*Assistant Examiner* — Tarell Hampton
(74) *Attorney, Agent, or Firm* — Dority & Manning, P.A.

(57) ABSTRACT

The subject matter of this specification can be implemented in, among other things, a method for determining a wireless access point location. The method includes a step for receiving session data from at least one mobile device, wherein each instance of the received session data includes one or more global positioning system (GPS) data points, one or more sensor data points, and one or more WiFi scan data points, wherein the one or more WiFi scan data points are associated with one or more wireless access points (WAPs). The method also includes a step for calculating a location of at least one of the one or more WAPs using at least a portion from each of the received one or more global positioning system (GPS) data points, the one or more sensor data points, and the one or more WiFi scan data points.

17 Claims, 8 Drawing Sheets

DETERMINING A WIFI SCAN LOCATION

FIELD

This instant specification relates to location management systems, in particular to determining the location of wireless access points (WAPs).

BACKGROUND

Some WiFi location techniques rely on receiving GPS data paired with WiFi scans from a large set of devices. The received data is then used to determine the location of wireless or WiFi access points (WAPs). Once the location of WAPs are known, WiFi enabled devices can perform WiFi scans and use a database of known access point locations to compute the locations of the WiFi enabled devices.

One shortcoming of the GPS based approach is that it typically cannot accurately determine the location of wireless access points for areas where GPS is unavailable, such as in indoor environments and urban canyons. This lowers both the accuracy and coverage of a WiFi access point database especially since the majority of access points are indoors, yet many of them cannot be seen at all outdoors or can only be seen with a very weak signal strength. This makes it difficult to compute an accurate location for an access point in areas where GPS is unavailable, thereby making it difficult to accurately compute and determine the location of a WiFi enabled device in those areas.

SUMMARY

The disclose subject matter relates to a method for determining a wireless access point location. In one aspect, the method includes a step for receiving session data from at least one mobile device, wherein each instance of the received session data includes one or more global positioning system (GPS) data points, one or more sensor data points, and one or more WiFi scan data points, wherein the one or more WiFi scan data points are associated with one or more wireless access points (WAPs). The method also includes a step for calculating a location of at least one of the one or more WAPs using at least a portion from each of the received one or more global positioning system (GPS) data points, the one or more sensor data points, and the one or more WiFi scan data points.

The disclosed subject matter further relates to a non-transitory computer-readable medium. The computer-readable medium includes instructions that, when executed by a computer, cause the computer to implement a method for determining location of a WiFi scan. The instructions include code for receiving session data from a plurality of mobile devices, wherein each instance of the received session data includes a plurality of global positioning system (GPS) data points, a plurality of sensor data points, and a plurality of WiFi scans, gathered periodically by the plurality of mobile devices. The instructions include code for selecting, from the received session data, a subset of session data for calculating a location of a WiFi scan. The instructions also include code for calculating a location of at least one of the plurality of WiFi scans using the selected subset of session data.

The disclosed subject matter further relates to a system for determining a wireless access point location. The system includes one or more processors and a memory including instructions which, when executed by the one or more processors cause the one or more processors to receive session data from a plurality of mobile devices, wherein the received session data includes a plurality of global positioning system (GPS) data points, a plurality of sensor data points, and a plurality of wireless access data points, gathered periodically by the mobile devices. The instructions also cause the one or more processors to select a subset of session data from the received session data. The instructions also cause the one or more processors to calculate the location of a wireless access point (WAP) using the selected subset of session data, wherein the WAP is one of the plurality of wireless access data points.

The details of one or more implementations are set forth in the accompanying drawings and the description below. Other features and advantages will be apparent from the description and drawings, and from the claims.

DETAILED DESCRIPTION

Figure 1:
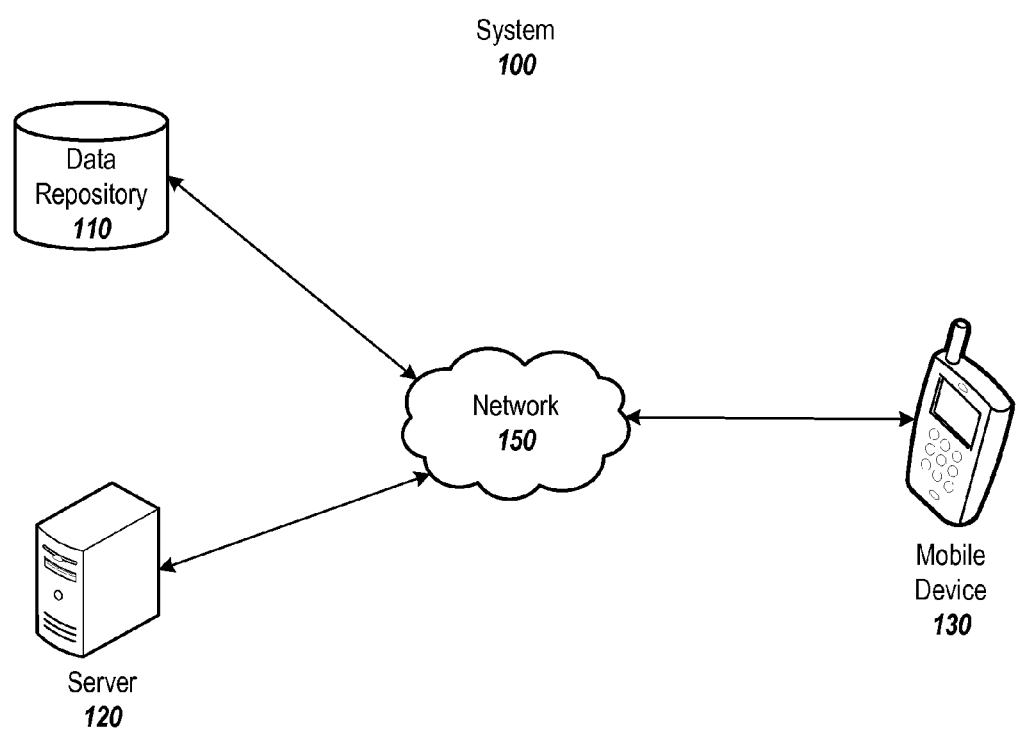
FIG. 1 is a schematic diagram that shows an example of a system for managing location data.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, some structures and components are shown in block diagram form in order to avoid obscuring the concepts of the subject technology.

This disclosed subject matter provides for systems and techniques for managing location data, particularly to inferring location of wireless access points (WAPs). For example, one goal is to determine location, e.g., latitude-longitude location information for WiFi scans in sessions' data (e.g., received from multiple mobile devices), particularly where GPS is unavailable. Location determined for multiple WiFi scans may be used to determine a more accurate location for one or more WAPs in range of the scans, thereby allowing for updating of location (e.g., latitude-longitude coordinates) information for WAPs in a location data repository or location database. Location determined for multiple WiFi scans may also be used to build a database of fingerprint models of areas (discussed in more details below).

The location database may be used in a similar fashion as to how GPS to WiFi scans are used to determine locations of devices to deliver location based services (LBSs). For example, one advantage is significant coverage and accuracy improvements of location databases storing information about the location of WiFi scans and/or WAPs, particularly allowing location information to be generated for areas which were previously inaccessible.

In various aspects, geographic location for a WAP (e.g., latitude/longitude information for a wireless access point) is determined using session data gathered from a wireless device. The session data may include GPS data, sensor data, and WiFi scan data. Sensor data may include accelerometer readings, gyroscope readings, and/or compass readings from the mobile devices. WiFi scan data may include a set of WiFi data points, including WAP identifiers and signal strength for those WAPs in range of the mobile device at the time of the scan. Session data may be accumulated periodically (e.g., every 5 minutes) providing GPS data points per second, WiFi scan data per second, and sensor data accumulated over the period (e.g., 60 accelerometer readings per second and 100 gyroscope readings per second).

Session data may be accumulated at any other suitable periodic interval (e.g., send session data gathered over every 1 minute, or over every 10 minutes, etc.) and individual types of data in any particular session data may be collected at any other suitable interval (e.g., once every 0.5 second or once every 2 seconds, etc.) In various other aspects, a location of a WAP is determined using session data gathered from multiple wireless devices (e.g., a crowd-sourced implementation). The accumulated session data may be stored locally on the mobile device and communicated at a later point to a location data management system (e.g., send sessions accumulated over 8 hours or some other time frame).

In various aspects, received session data is used to determine one or more mobile devices' paths, from previous known GPS data point or trail of GPS data points, to infer location information for one or more WAPs encountered by the mobile devices. In some implementations, a mobile device's path is calculated using a dead-reckoning algorithm. Paths may be calculated for those sessions where a determined activity type for the session is suitable for dead-reckoning calculations. For example, dead-reckoning calculation of a path may be more accurate where the activity type is determined to be walking while the phone is in pocket (e.g., corresponding to no tilting of the mobile device) thereby providing a more reliable indication that gyroscope readings are indicative of turns in the user's movement and not due to hand movement of a device in hand. Calculated paths may be filtered for those sessions where a calculated path does not have too large of an error (discussed in more details below).

In some implementations, a device's path is calculated by taking accelerometer readings to determine the number of steps taken (e.g., accelerometer modulations may be used to count foot-steps) and gyroscope sensor data to determine the angle of turns. The combined information of steps and angle of turns is used to determine a mobile device's path. In some implementations, the calculated device path is then oriented based on a trace of previously known GPS data points provided in the session data, thereby aligning a path from where a GPS trail ends (e.g., due to a transition from outdoors to indoors). The aligned path information, combined with previous known GPS points may be used to infer location, e.g., the latitude and longitude of a certain point or WiFi scan in the session data.

In various aspects, a set of received session data is combined to more accurately determine WiFi scan's and/or WAP's locations. Received session data may be grouped by those sessions having session data for devices near each other (e.g., take sessions within a small region of each other, say in about the size of a building). Session data may be taken for those sessions near each other in order to reduce the number of calculations required to accurately determine WAP locations. Session data grouped for sessions arising from within a small region may be filtered for a subset of sessions having similar WiFi scan features with each other. WiFi scans may be considered to have similar features where the scans are for the same or roughly the same location. In various implementations, the filtered subset of session data is used to infer WiFi scan and/or WAP locations.

For example, a set of session data containing 1000 traces may be selected for location processing. The set of session location may be filtered to remove those sessions indicating an activity type not suitable for dead-reckoning calculations, e.g., leaving 700 sessions having "good" data for path calculations. Paths may be calculated for those 700 sessions (e.g., using a dead reckoning algorithm).

The 700 sessions may be grouped by data for sessions within a small region. This step may result in 7 groups of session data, each having 10 sessions. Each group of session data may then be analyzed to create a list of sessions containing similar WiFi scan features (e.g., one or more sessions having WiFi scans roughly near each other or for the same location), maybe resulting in 3 sessions having similar WiFi features. Each WiFi scan in the list of similar WiFi scans (e.g., the hypothetical 3 sessions), may then be processed to infer latitude-longitude coordinates for the WiFi scan or WAPs in the WiFi scan.

For example, latitude-longitude coordinates of steps (e.g., calculated foot-steps as discussed above), at a time stamp immediately before and immediately after the WiFi scan being analyzed, may be determined (e.g., by using a previously known GPS data point and path from that know point). The determined latitude longitude coordinates for the two steps may be used to interpolate the latitude longitude coordinates of the WiFi scan. The interpolation of latitude longitude for a WiFi scan may be performed along one or more paths having similar WiFi features. The latitude-longitude values interpolated for a WiFi scan in multiple sessions (e.g., because the WiFi scans are roughly in the same location) may be combined to infer the location of a WiFi scan.

For example, WiFi scans having similar features may be combined to correct errors in orientation of a calculated path. Taking an example where analysis of a single session leads to the determination that a user of the device was initially walking exactly North when the user enters a building (an outdoor to indoor transition). Once, the user has entered the building, locations will be inferred for WiFi scans taken in the indoor part of the session data taking into account that the user was initially heading North. However, if several other sessions having similar features (e.g., for the same area or roughly the same area) lead to the determination that the user was actually heading North-east, then the orientation of the user's path may be corrected based on the combined session information.

The location information for a WiFi scan may be stored in a location database. Latitude/longitude information determined for a WiFi scan may be stored along with the WiFi scan, including the WAP identifiers in the scan and signal strength for each WAP identified in the scan. Stored latitude/longitude data for WiFi scans may be used to infer location information for WAPs. For example, a set of rows containing location information for a particular WAP identifier or mac address for a WAP may be selected, and the combined set of rows along with GPS information may be used to infer more accurately the location of that particular WAP. The determined location for the WAP may then be stored or updated in a location database.

Stored latitude/longitude data for WiFi scans may be used to build a fingerprint model of an area. For example, a database of the location of WiFi scans that have been determined for an area may be maintained. Such a fingerprint database may be used in a host of ways, including in detecting a location for a mobile device. For example, a phone may send a location request, supplying a WiFi scan (e.g., WiFi scan of its current location). The fingerprint database may be searched for a Wifi scan that is similar to the supplied WiFi scan. Similar may include selecting the WiFi scan pair (e.g., the WiFi scan and associated location information) in the fingerprint database that have similar MAC addresses and similar signal strengths to the supplied WiFi scan. Upon finding a similar WiFi scan in the fingerprint data, the associated or calculated location information may be supplied to the requesting phone. In such a use case, WiFi scan pairs (e.g., WiFi scan and associated location information) are directly used to determine phone locations without necessarily having to determine any associated WAP locations.

FIG. 1 illustrates an example of a system 100 configured to manage location information. A location may be represented, for example, as a latitude, longitude, and/or elevation or as a street address of a WAP. In some examples, a geographic location may be coupled with a radius of certainty (e.g., within two kilometers of a point or within 100 meters of a point). As shown, the system 100 includes a data repository 110, a server 120, and a mobile device 130. The data repository 110, the server 120, and the mobile device 130 may be configured to communicate with one another via a network 150. The network 150 may include the Internet, an intranet, a local area network, a wide area network, a wired network, a wireless network, a cellular network, a WiFi network, or a virtual private network (VPN).

The data repository 110 may store data (e.g., session data, GPS data, sensor data—accelerometer reading, gyroscope readings, compass readings, WiFi scan information—WAP identifiers and associated signal strength, location information for WiFi scans, location information for WAPs, etc.) related to a location management system. For example, data repository 110 may maintain a WiFi scan pairs location information table with a column/attribute for a WAP identifier (e.g., a WAP id or mac address of WAPs), one column/attribute for signal strength of the WAP having that identifier, and one or more columns/attributes for location information associated with that WiFi scan (e.g., latitude/longitude coordinates). Another table may maintain WAP location information table with a column/attribute for a WAP identifier (e.g., where the identifier column is a unique key) and one or more columns/attributes for the location (e.g., latitude, longitude, etc.) of the WAP identified by the unique key.

The server 120 may include programming modules for a location management system. The server 120 may be implemented as a single machine with a single processor, a multi-processor machine, or a server farm including multiple machines with multiple processors, or a cluster of virtual machines in the cloud. One example of the server 120 is described in more detail in conjunction with FIG. 3 below.

The mobile device 130 may be a mobile phone, a personal digital assistant (PDA), a tablet computer, a netbook, or a laptop computer. The mobile device 130 may be portable and may oftentimes be carried by a user, for example, in a pocket, a purse, a backpack, or a briefcase. The mobile device 130 may be configured to communicate with server 120 to provide it session data periodically (e.g., provide GPS, WiFi scan, and sensor data gathered every 5 minutes). A user of mobile device 130 may opt out or opt in from using the described configured services of mobile device 130. While only one mobile device 130 is illustrated in FIG. 1, the subject technology may be implemented in conjunction with one or more mobile devices 130.

While each of the data repository 110, the server 120, and the mobile device 130 are illustrated in FIG. 1 as separate machines, in example aspects, one or more of the data repository 110, the server 120, and the mobile device 130 may be implemented as a single machine. For example, the functions of the data repository 110 and the server 120 may be implemented within a single machine. Each of the data repository 110 and server 120 may also be implemented as multiple machines, a virtual cluster of machines, etc.

Figure 2:
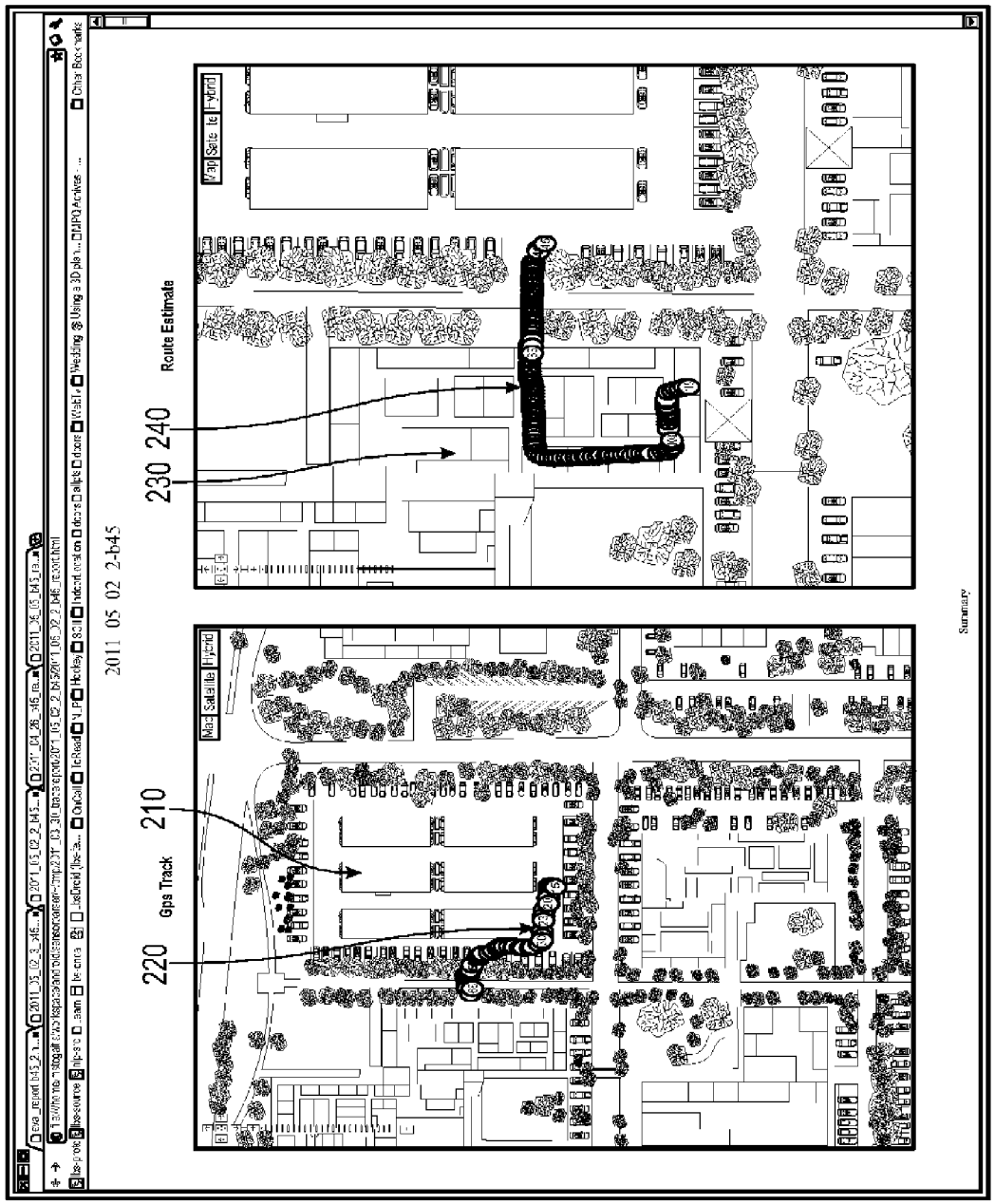
FIG. 2 is a schematic illustrating examples of mobile device paths in indoor and outdoor environments.

FIG. 2 is a schematic illustrating examples of mobile device paths in indoor and outdoor environments. Reference number 210 is pointing to an outdoor area, like a parking lot in front of a building 230. The path 220, depicted by a set of circles (indicating a WiFi scan) is shown to end near the entrance of the building 230, likely due to loss of GPS signal. Path 220 therefore illustrates a path that may be determined using available GPS data and WiFi scans. Reference number 230 is pointing to an indoor environment like a building. For example, due to a user of the mobile device walking into building 230. Path 240 connects path 220, where it trailed off, and connects to it a calculated path going through the building 230. FIG. 2 illustrates on the left side a path 220 in an outdoor environment and on the right side a calculated path 240 that connects the outdoor path 220 by calculating a possible device path indoors. Path 240 may be determined using the subject disclosure.

Figure 3:
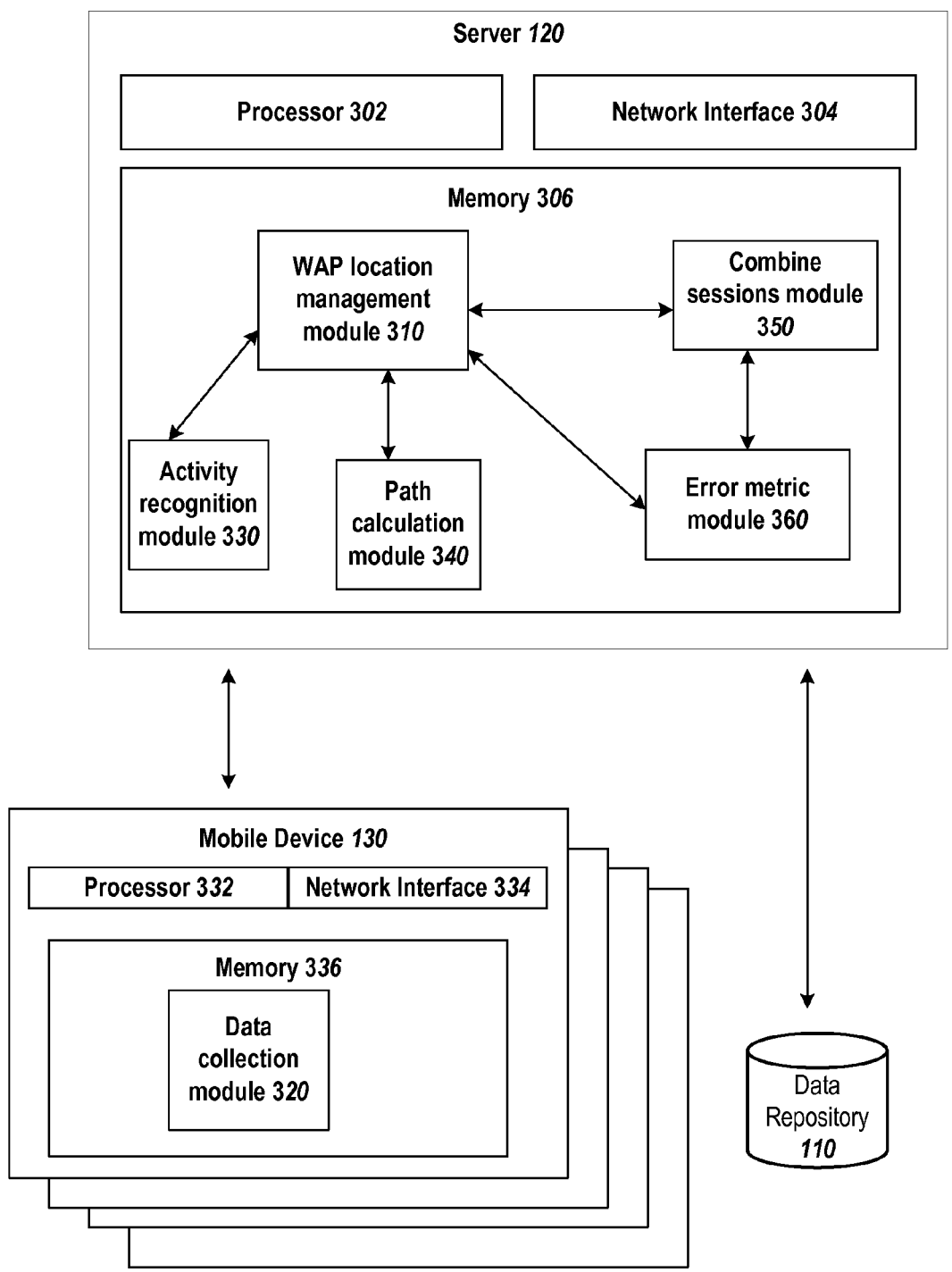
FIG. 3 illustrates an example of the server and mobile device of FIG. 1 in more detail.

FIG. 3 illustrates an example of the server 120 and mobile device 130 of FIG. 1 in more detail. As shown, the mobile device 130 is connected to server 120. Mobile device 130 may send session data to server 120 and receive location information from server 120 via its connectivity to server 120. Server 120 may communicate with data repository 110 to store session data, to retrieve session data for location calculations, to store WiFi scan pairs' calculated location information (e.g., in a WiFi scan pairs table), to store WAP location information (e.g., in a WAP location table), etc. via its connectivity to data repository 110.

As shown, the server 120 includes a processor 302, a network interface 304, and a memory 306. The mobile device 130 includes a processor 332, a network interface 334, and a memory 336. The processors 302 and 332 are configured to execute computer instructions that are stored in a computer-readable medium, for example, the memory 306 or the memory 336 respectively. The processor 302 or 332 may be a central processing unit (CPU). While only one processor 302 and 332 are illustrated, the server 120 or the mobile device 130 may include multiple processors. Furthermore, while the server 120 is illustrated as a single machine, the server 120 may include multiple machines, e.g., within a server farm. Also, mobile device 130 is depicted as a plurality of mobile devices that communicate with server 120 to send session data and receive location information.

The network interface 304 and 334 are configured to allow the server 120 and mobile device 130 and data repository 110 to transmit and receive data in a network, e.g., network 150 of FIG. 1. The network interface 304 and 334 may include one or more network interface cards (NICs). The memory 306 and 336 may store data or instructions.

As illustrated, server 120's memory 306 includes a WAP location management module 310, an activity recognition module 330, a path calculation module 340, a combine session data module 350, and an error metric module 360. Mobile device 130's memory 336 depicts a data collection module 320 for gathering session data (e.g., GPS data points, WiFi scans, sensor data, etc.) and periodically sending it to server 120, e.g., to the WAP location management module 310.

Data collection module 320 on mobile device 130 may collect session data to provide to WAP location management module 310 for determining WiFi scans' locations. The data collection module 320 may run in the background of the mobile device 130 and may periodically collect short sessions of continuous data to send to server 120. In some implementations, data collection module 320 may record sessions of: GPS points once a second, WiFi scans once a second, accelerometer, gyroscope and compass readings, e.g., for 5 minutes. Recorded session data may then be communicated to WAP location management module 310 (e.g., every 8 hours or some other time interval) for WiFi scan location calculations. WAP location management module 310 may receive session data from one or more mobile devices periodically.

WAP location management module 310, upon receiving session data, may store/buffer the received session data in, e.g., data repository 110 for future processing of location calculations (e.g., batch processing of WiFi scan location calculations once every week). WAP location management module 310 may instead use some or all of the received session data, from one or more mobile devices, to perform calculations as the session data is received from mobile devices.

WAP location management module 310 may be configured to communicate with activity recognition module 330, path calculation module 340, combine session data module 350, error metric module 360, and/or data repository 110 to calculate locations for WiFi scans. WAP location management module 310 may retrieve a set of session data (e.g., every once a week or at some other batch processing interval) from, e.g., data repository 110, to calculate WiFi scan locations. WAP location management module 310 may filter the retrieved set of session data for those sessions where a user of the mobile device walked from a place with GPS coverage to a place without GPS coverage, e.g., a session having an indoor to outdoor transition, prior to processing the retrieved set for location calculations. WAP location management module 310 may filter the retrieved set of session data for those sessions having WiFi access points information.

WAP location management module 310 may provide some or all of the set of retrieved session data to activity recognition module 330 to filter sessions for those sessions that may be suitable for processing or path calculation (e.g., using a dead reckoning algorithm). For example, activity recognition module 330 may select those sessions where a user of the mobile device 130 is determined to be walking while the mobile device 130 is in a pocket, and discard sessions where the mobile device 130 is determined to be swinging in a hand of a user of the mobile device (e.g., tilting).

The activity recognition module 330 may analyze the set of sensor data (e.g., provided as the session data sent to it by WAP location management module 310) to determine the most likely activity of a user of the mobile device 130 (e.g., walking, driving in a car, stationary, tilting, etc.) Activity determination may be done because certain activities may not lead to session data suitable for dead reckoning algorithm path calculations. For example, if a tilting activity is determined then such session data may be rejected (e.g., because orientation/direction of that session may not lead to meaningful information for determining an alignment path).

In some aspects, activity recognition module 330 may filter session data not suitable for path calculations by analyzing each instance of session data in the set of retrieved session data. One instance of session data in the set of session data may represent session data received from a mobile device during one period of accumulated session data. In some implementations, the steps followed by activity recognition module 330 to determine an activity type for instances of session data may include:

1. For each instance of session data in the set of session data:
2. Start on a first accelerometer reading in the instance of session data being analyzed, e.g., by setting a StartOfWindowIndex=0.
3. Extract a 5 second window of accelerometer data from the starting window. Each reading of accelerometer sensor data may be composed of 3 values, describing an acceleration on the x, y and z axes.
4. Check if the 5 second window shows a significant tilt in the accelerometer of the mobile device 130 that provided the instance of session data being analyzed. To do this, activity recognition module 330 may compute the mean of the first and last 1.5 seconds of the 5 second window for each of the 3 axes reported by the accelerometer. If the difference determined between the early mean and late mean is found to be >3, then activity recognition module 330 may mark this window as 'tilting'.
5. If the window is not tilting, check to see if a user, of the mobile device that provided the instance of session data being analyzed, was walking during the 5 second window. To do this, activity recognition module 330 may compute the mean of the accelerometer data for each axis, and use the computed values as an estimate of a gravity vector for the mobile device. Then, project each accelerometer reading onto the estimated gravity vector and take the magnitude. By doing these calculations, activity recognition module 330 may determine a list of values indicative of how much acceleration happened parallel to gravity in that 5 second window. If the standard deviation of the values in the list is >1.6 &&<7.0, the user may be considered to be walking.
6. Move StartOfWindowIndex up by 2.5 seconds and go to step 2 and repeat until enough session data in the instance of session data being analyzed has been considered to make an activity type determination for the instance of session data.

The described sequence of steps may result in several local decisions as to the activity type of the mobile device in overlapping 5 second windows. The overlapping 5 second windows may then be aggregated to get an estimate of the activity type for the instance of session data being analyzed.

A particular local decision about the activity type in one or more 5 second windows may lead to a wrong determination of the activity type for the entire session. For example, one calculation may lead to the following activity type for the overlapping 5 second windows: WALKING, WALKING, WALKING, OTHER, WALKING, WALKING, WALKING. In such a case, the user may have been walking during the entire session but one of the 5 second windows may have been unable to deduce the walking activity type. In some implementations, activity recognition module 330 may aggregate the calculated activity type values, e.g., by doing a majority vote over 10 overlapping windows. For example, the activity that is seen the most often may be considered to be the activity for the session.

One exception to the aggregation may be a 'tilting' activity type. In some aspects, the determination of a "tilting" activity, even for one 5 second window, may lead the activity recognition module 330 to reject the entire session data. One reason may be because 'tilting' activity may break the ability of a dead reckoning algorithm to continue to track the movement of the user. Therefore, as soon as a 'tilting' activity is recognized, it may be marked as the activity for that instance of session data being analyzed.

In some implementations, activity recognition module 330 provides the filtered (e.g., based on the aggregate activity type as discussed above) set of session data to WAP location management module 310 for further processing. WAP location management module 310 may provide either the retrieved set of session data or the filtered set of session data to the path calculation module 340. Path calculation module 340 may take sensor data, for each instance of session data in the set of session data provided to it by the WAP location management module 310, and calculate a path that may have been traveled by a user of the mobile device during that session.

Path calculation module 340 may calculate the path for an instance of session data by converting accelerometer readings into steps and gyroscope readings into turns. Path calculation module 340 may then use the GPS trail data points (from the session data) to orient the calculated path in space and as a start point anchor. In some implementations, a dead reckoning algorithm may be used for calculating the path. The path calculation module may provide the calculated paths for one or more instances of session data in the set of session data to WAP location management module 310 for further processing.

In some implementations, path calculate module 340 may use sensor data to determine the number of steps and orientation from a previous known GPS point. Distance information may be gathered by counting steps based on accelerometer readings. For example, by analyzing the frequency modulation in the accelerometer readings, each transition from a high to a low point may constitute one step. Step counts for distance calculations may provide better distance measurements because double integration from accelerometer readings may be too noisy for accurate distance calculations.

In some implementations, path calculate module 340 may determine the orientation of a path based on known GPS data points (e.g., provided in the session data). A trail of GPS data points can be used to construct a GPS path up to the point GPS signals were available. The above step counts and gyroscope readings for turns may be used to construct a path from where GPS signal was lost (e.g., outdoor to indoor transition). The constructed path may then be oriented based on the GPS path to form an alignment path that use of the mobile device may have taken during the session. The alignment path, in conjunction with one or more previously known GPS data points, may then be used to infer the latitude-longitude of WiFi scans in the session.

WAP location management module 310 may communicate with combine sessions data module 350 for combining session data for location calculations for WiFi scans. WAP location management module 310 may provide the calculated/aligned paths received from path calculation module 340, to combine sessions module 350 for combining session information. Combine session module 350 may analyze multiple sessions data for the same region together to improve the accuracy of the estimated user paths. In some implementations, the steps followed by combine session data module 350 may include:

1. Group sessions that are within a small region together (e.g., about the size of a building). For example, the grouping may be done by breaking up the world into a large grid (e.g., 200 meters×200 meters) and grouping and selecting those sessions that have at least one location point within the same square of the grid. The location point within the same square of grid may be based on GPS data points in the received session data or it may be derived using WiFi scan information received in the session data combined with an existing WiFi location database. For example, a particular set of session data being analyzed may contain 1000 traces spread around a city. The grouping by a small region may result in 10 of the 1000 traces being for session data within a small region, e.g., within a square of a hypothetical grid as described above. One of goals of the grouping by small region step may be to reduce the number of calculations to extract sessions with similar WiFi features (as described below in more details).

2. For each group determined above:

3. Extract sessions having similar WiFi features from the different sessions, where similar WiFi features are those sessions where their respective WiFi scans are determined to be likely to be near each other between different sessions. In some aspects, a WiFi scan may be considered to have similar features to another scan where the two scans are for an area that is no greater than a predetermined WiFi distance threshold. In the example described above, grouping within a small region may result in 10 of the 1000 traces being for sessions within a small region, and extracting session for scans having similar WiFi features may result in 2 or 3 out of the 10 sessions being for those sessions passing through roughly the same location. An algorithm to extract similar WiFi features from different sessions may be used to get a rough estimate of when two phones passed through the same or roughly the same location. (see "Algorithm to extract similar WiFi features from different sessions" below for more details).

4. Throw out paths who's error is too large as the path is likely to be an outlier. Combine sessions module 350 may have received calculated paths from WAP location management module 310 (e.g., as provided to it by path calculation module 340). Combine sessions module 350 may then discard sessions and/or calculated paths for sessions who's error is too large (see error metric module 360 description below for more details). For example, combine sessions module 350 may rejects sessions who's error is computed (e.g. by error metric module 360) to be larger than 20 and/or is larger than 90% of the errors of the other paths. Each session path may have a few potential sources of error:

Initial orientation error->for example, location management system determines that the mobile device started out heading north but it was actually pointing east.

Initial location error->this location may typically be taken from GPS data but may have not been accurate due to GPS inaccuracy Step size error, e.g., the dead reckoning algorithm may have estimated an erroneous step size for a session path, compute an error metric that indicates how much it agrees with other paths (see "Error metric calculation").

5. For the remaining paths, correct the error iteratively by doing the following:

6. For each path:

7. Compute an error metric (e.g., by error metric module 360), try each combination of small variations to the initial orientation, initial location and step size.

8. For each variation,

9. Re-compute the error metric for the path. Keep the set of variations that has the smallest error metric.

10. NumberOfIterations++; if (NumberOfIterations<10) go to step 8. The described loop may help with path alignment, by for example, re-computing an error metric for each variation and using the variation from a previous iteration that achieved the smallest error metric, possibly resulting in several small adjustments that align traces to each other.

The algorithm to extract similar WiFi features from different sessions determines WiFi scans that are likely to be near each other between different sessions. In some implementations, combine sessions module 350 invokes the extract similar WiFi features algorithm to find sessions having WiFi scans passing through roughly the same location or the same location. In some implementations, WiFi scans having similar WiFi features may be determined by:
1. For each instance of session data in the group of session data determined to be within the small region (as discussed above) do:
2. For each WiFi scan in the instance of session data (called currentScan), do:
3. if none of the access points in the scan have a strong signal strength (e.g., >=−75), go to next scan
4. else, compute the Euclidean distance between the scan and all scans of other sessions in this group that have at least one access point with a strong signal strength.

In some implementations, the Euclidean distance between two scans may be computed by taking the square root of the sums of the square of the distance between the signal strength values of access points with the same mac address between the two scans. A signal strength value of −100 may be assigned as the signal strength value for a WAP not found in one scan but present in the other scan. The scan of other sessions that best matches the currentScan may be selected as the scan with the smallest Euclidean distance from the currentScan. If the selected distance is smaller than a threshold (e.g., 25), it may be indicative that the two scans are likely to be close to each other. The currentScan then may be added to a list of scans considered to have similar WiFi features.

Combine session module 350 may communicate with error metric module 360 to calculate errors. Combine session module 350 may provide the list of scans considered to have similar WiFi features (as described above) for error metric calculations. Error metric module 360 may calculate error values for each WiFi feature or scan in the provided list. In some implementations, errors may be calculated by:
1. For each WiFi feature (e.g., WiFi scan in the list of scans having similar WiFi features):
2. Find the steps or calculated foot-steps who's timestamps are just before and just after the timestamp of the WiFi scan in a first path containing the WiFi feature being processed. Determine the latitude-longitude values of the WiFi scan by interpolating between the two steps in the first step. Find the steps who's timestamps are just before and just after the timestamp of the WiFi scan in one or more others paths containing the WiFi feature being processed. Determine the latitude-longitude of the WiFi scan by interpolating between the two steps in the one or more other paths. Compute the distance between the latitude-longitude of the WiFi scan of the first path and the latitude-longitude of the WiFi scan of the one or more other paths, one computed distance for each of the other paths.
3. Compute a weighted sum of the computed distances, where the weight may be based on how long into a trace a scan occurs. This may give more weight to scans that are earlier in the path as paths tend to get less accurate the longer they get.

System 300 and functionality described using the example modules of system 300 may result in accurate latitude-longitude to WiFi scan information. The calculated WiFi scan to latitude-longitude information may then be stored in a data repository 110. Location information in WiFi scan pairs may then be used with GPS data points to better estimate location (e.g., latitude and longitude) of WAPs. WiFi scan pairs information may be used to build a database of fingerprint of models of areas.

The modules and description for system 300 is one example of how the subject disclosure may be implemented. The modules may be divided in any variety of ways without deviating from the scope of this disclosure. The steps and/or functionality described for various modules may be executed by other modules and may be executed in an order different from what is described for FIG. 3 without deviating from the scope of this disclosure. Described steps or functionality may not be executed in all implementations. For example, filtering by activity type, or grouping by small regions, etc. may or may not be required to determine locations.

Although aspects of the subject technology may be described as being performed on a client or server machine, aspects of the subject technology may distribute workload performed at a client or server machine differently from the described aspects, without deviating from the scope of this disclosure. In some aspects, session data may be processed partially on a wireless device before sending to a location management system's server. For example, accelerometer and gyroscope data, collected by a mobile device, may be used to calculate a path by a module on the mobile device. The calculated path (e.g., including a series of steps with timestamps, and angles of turns) may be sent, instead of or in addition to the raw data, to a location management system for further processing. As such, client and server computation workload may be distributed in various ways without deviating from the scope of this disclosure.

Figure 4:
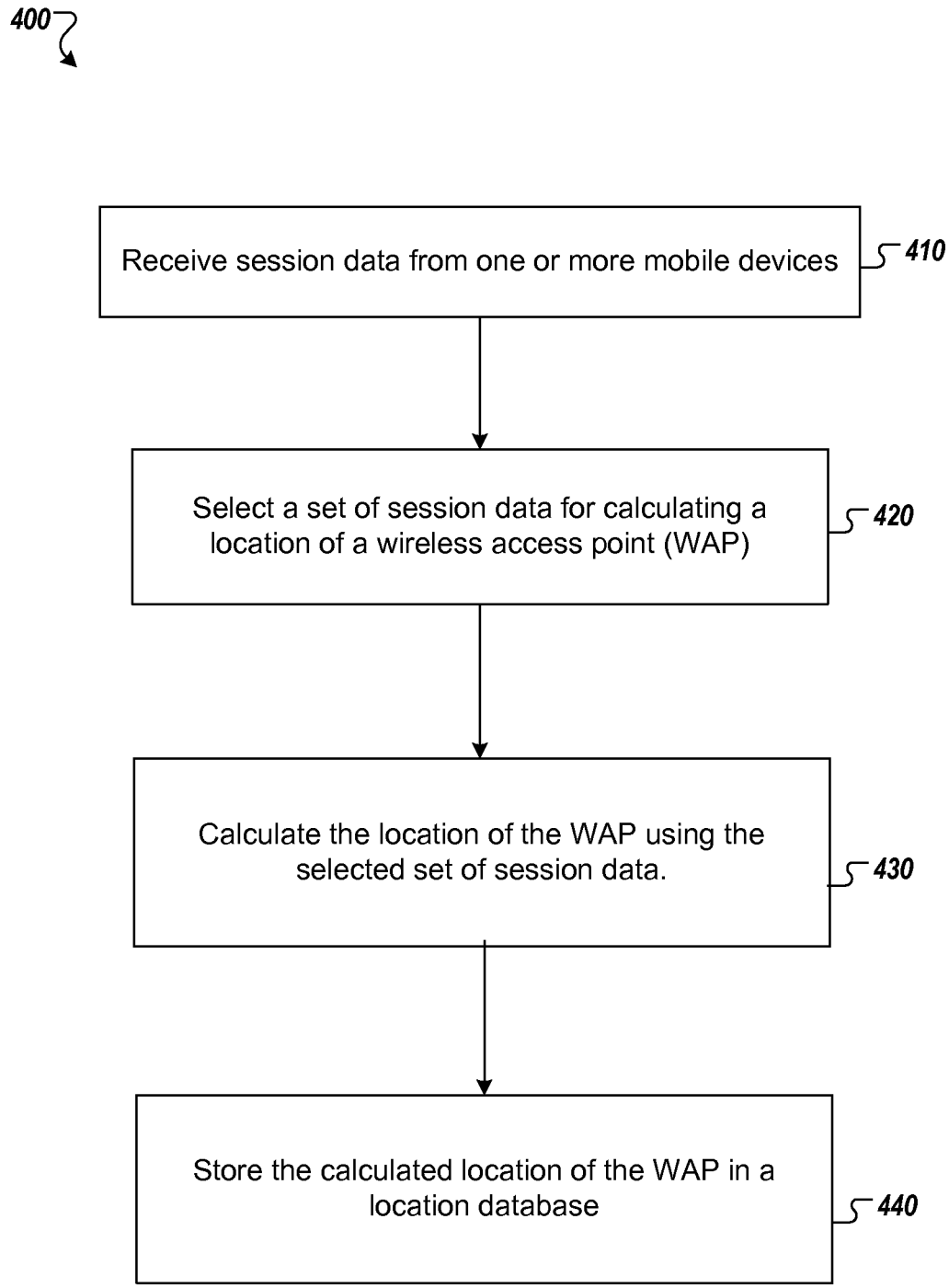
FIG. 4 is a flowchart of an example process for determining WAP location using session data received from one or more mobile devices.
Figure 5:
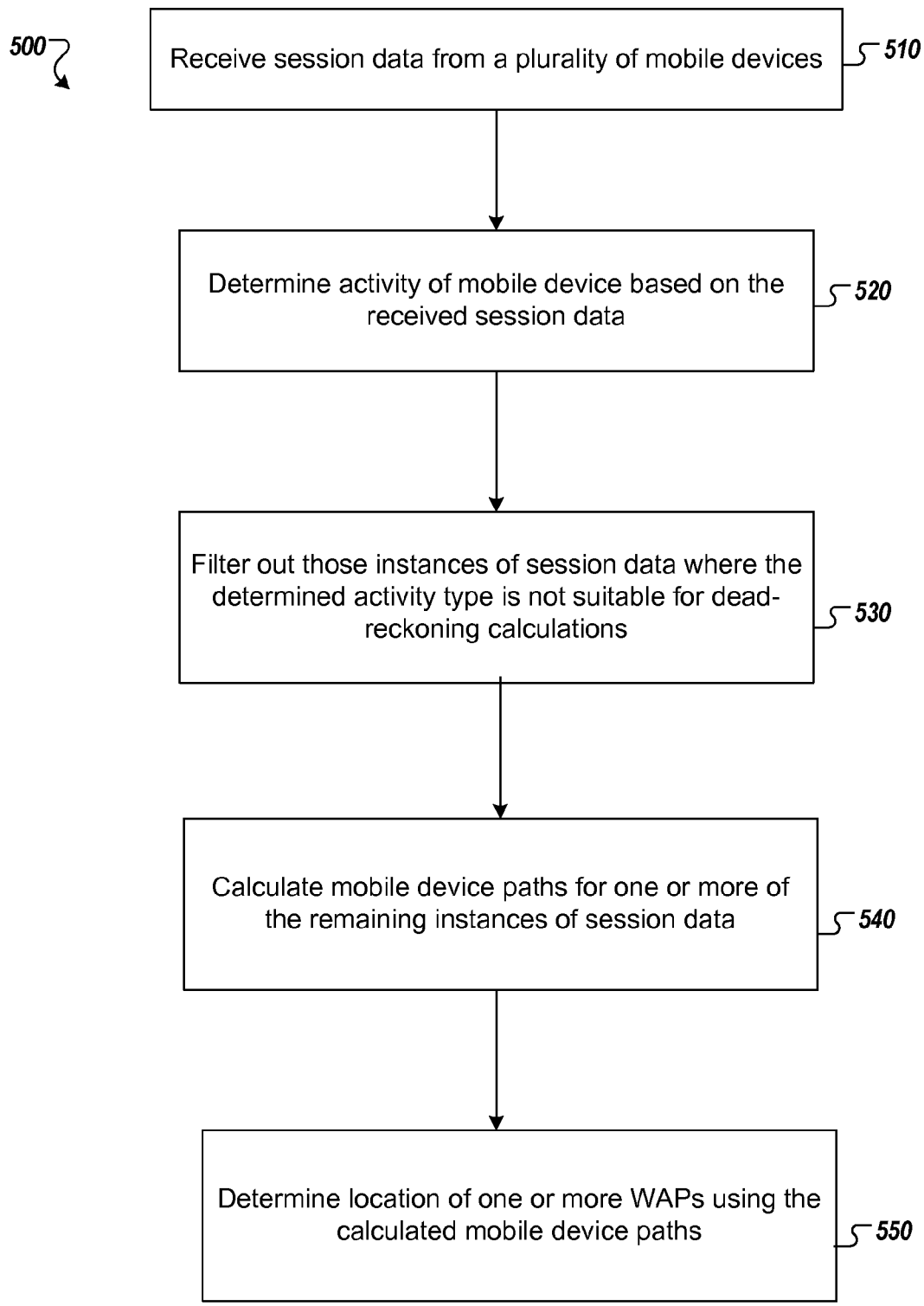
FIG. 5 is a flowchart of another example process for determining WAP location using session data received from multiple mobile devices.
Figure 6:
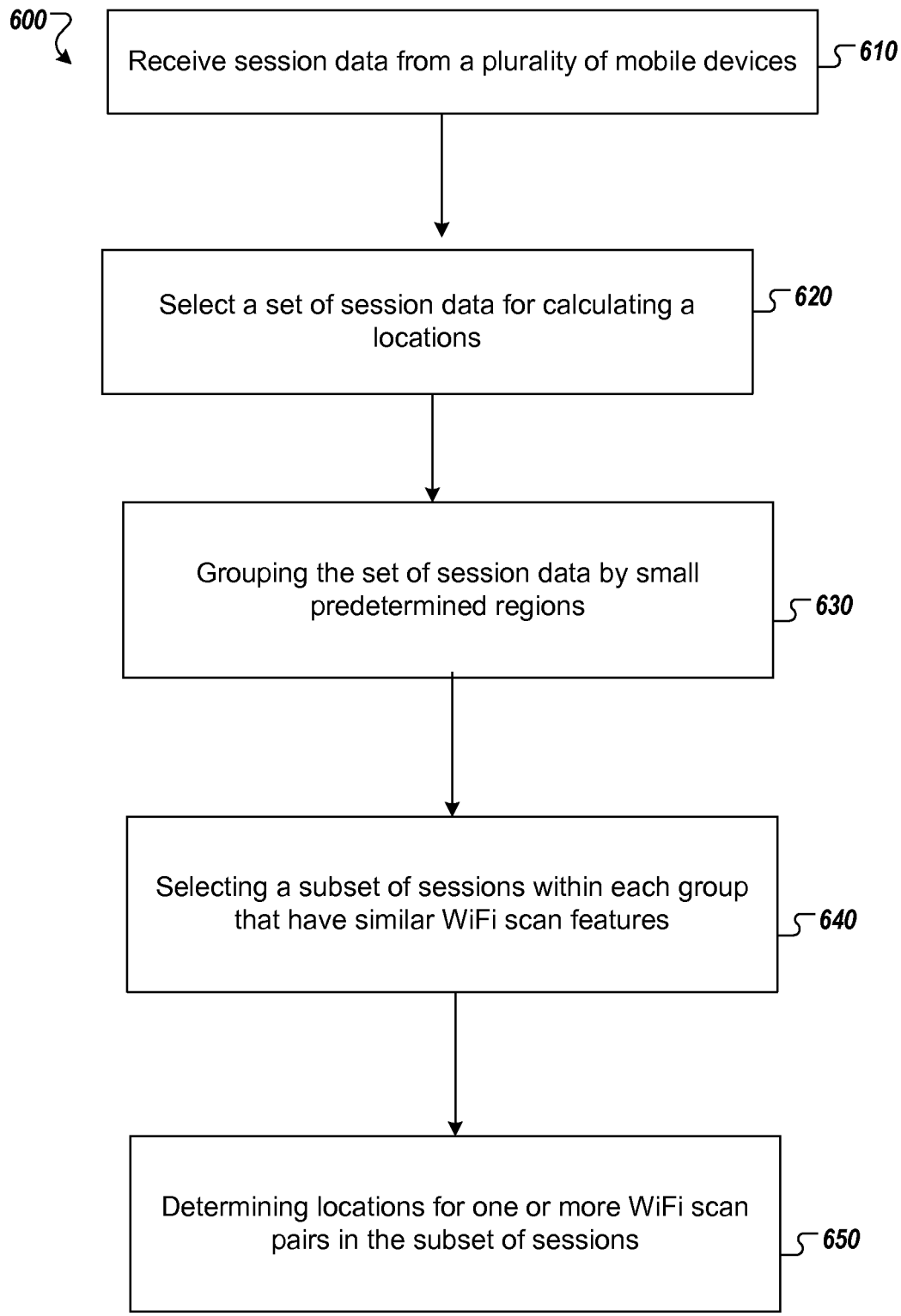
FIG. 6 is a flowchart of another example process for determining WAP location using session data received from multiple mobile devices.

FIGS. 4, 5, and 6 are flow charts that show examples of processes for determining WiFi scan pairs and WAP locations using session data gathered from multiple mobile devices. The processes may be performed, for example, by a system such as the system 300. For clarity of presentation, the description that follows uses the system 300 as examples for describing the processes. However, another system, or combination of systems, may be used to perform the processes.

FIG. 4 is a flowchart of an example process for determining WAP locations using session data received from one or more mobile devices. Process 400 of FIG. 4 starts at step 410. A step 410 session data is received from multiple mobile devices. The session data may include WiFi scans, GPS data points, sensor data. Session data may be received periodically, e.g., a mobile device may provide session data accumulated every 5 minutes to a system 300 for location calculations. Session data received at step 410 may be stored, e.g., in a data repository 110 as described for system 300, for processing at a later point in time. Session data received at step 410 may be received continuously and periodically from one or more mobile devices configured to provide session data.

At step 420, a set of session data is selected for calculating locations (e.g., latitude-longitude coordinates) for one or more WAPs. Step 420 may be executed by selecting a set of session data from a data repository 110, storing previously received session data, e.g., as described for step 410. Step 420 may be executed periodically to process locations for WAPs, e.g., once every day or once every hour.

At step 430, the set of session data selected at step 420 is processed for determining locations of one or WAPs found in the set of session data. Step 430 may be executed by modules described for process 300. Step 430 may include calculating the activity type and paths for sessions in the set of session data. Paths may be calculated for those sessions where a determined activity type is suitable for path calculations (e.g., no tilting). (See description above for activity recognition module 330 and path calculation module 340 for more details). Step 430 may include combining session data from multiple sessions to infer latitude-longitude coordinates for WAPs. For example, sessions may be grouped by sessions within a small region (See description above for combine sessions module 350 for more details).

Each group of sessions for small regions may be analyzed to derive a list of WiFi scans having similar features between two or more instances of session data in the group. WiFi scans may be considered to have similar features where two or more sessions have WiFi scans for roughly the same physical location (See description above for combine sessions module 350 for more details). Step 430 may include inferring the latitude-longitude coordinates for each WiFi scan in the list of scans having similar WiFi features, by for example taking the latitude-longitude coordinates of steps on the calculated path, that are immediately before and immediately after the WiFi scan timestamp, and interpolating latitude-longitude coordinates for the WiFi scan in one or more paths. A location may be inferred for a WiFi scan by combining the interpolated latitude-longitude from multiple paths for the WiFi scan in the list of scans having similar features.

Locations calculated for WiFi scans at step 430 may be stored in a data repository 110. Data repository may store WiFi scan pair location information such as WAP identifiers in the scan, the signal strength associated with WAPs in the scan, and the inferred latitude-longitude coordinates of one or more WAPs in the scan. Step 430 may use location information calculated for WiFi scans to infer location information for a WAP. For example, step 430 may include selecting a set of rows from a WiFi scan pair location information table, for the same mac address or WAP identifier, and combining it with GPS information or data points to more accurately infer the location of a particular WAP. At step 440 location information determined for a WAP may be stored in location data repository 110, e.g., in a WAP location information table.

FIG. 5 is a flowchart of another example process 500 for determining WAP locations using session data received from a plurality of mobile devices. At step 510 session data is received from one or more mobile devices. At step 520, an activity type is determined for each instance of session data in the received sessions. Step 530 filters out sessions having activity type not suitable for path calculations, for example it may lead to selecting walking activity types where phone is in pocket or is stationary, while discarding tilting activity types (see Activity recognition module 330 above for more details).

At step 540, paths are calculated for remaining sessions, those sessions that were not filtered out at step 530. Step 540 may include taking accelerometer readings from session data to estimate distances using step counts (e.g., accelerometer modulations from high to low may be indicative of one footstep). Step 540 may also include using gyroscope information to determine angle of turns. Using the combined information about steps and angle of turns, a path may be calculated for each session. The calculated path may be oriented using a trail of GPS points in the session data, providing an aligned path. At step 450, the calculated paths may be used to determine locations of WAPs. Step 550 may include, taking the calculated and aligned path to infer location information for WiFi scans in the session data. Step 550 may also include taking WiFi scan location information to infer location information for a particular WAP.

FIG. 6 is a flowchart of another example process 600 for determining WAP locations using session data received from multiple mobile devices. At step 610 session data is received from multiple devices. At step 620 a set of session data is selected for location calculations. For example, at step 620 a data repository 110 may be queried to retrieve a set of previously received session data. At step 630 the set of session data is grouped by small regions (see above discussion on combine sessions module 350 for more details).

At step 640, each group of session within a small region is filtered for those sessions having similar WiFi scan features (see above discussion on combine sessions module 350 for more details—algorithm for extracting similar WiFi features). A WiFi scan in two or more sessions may be considered to have similar WiFi features where the scan is for the same or roughly the same physical location. At step 650 each WiFi scan considered to have similar WiFi features in two or more sessions will be used to infer a location for the WiFi scan. This may be done by taking a latitude-longitude coordinates for a step immediately before and a step immediately after the WiFi scan in the two or more paths, and using the combined information to infer a latitude-longitude coordinates for the WiFi scan.

Figure 7:
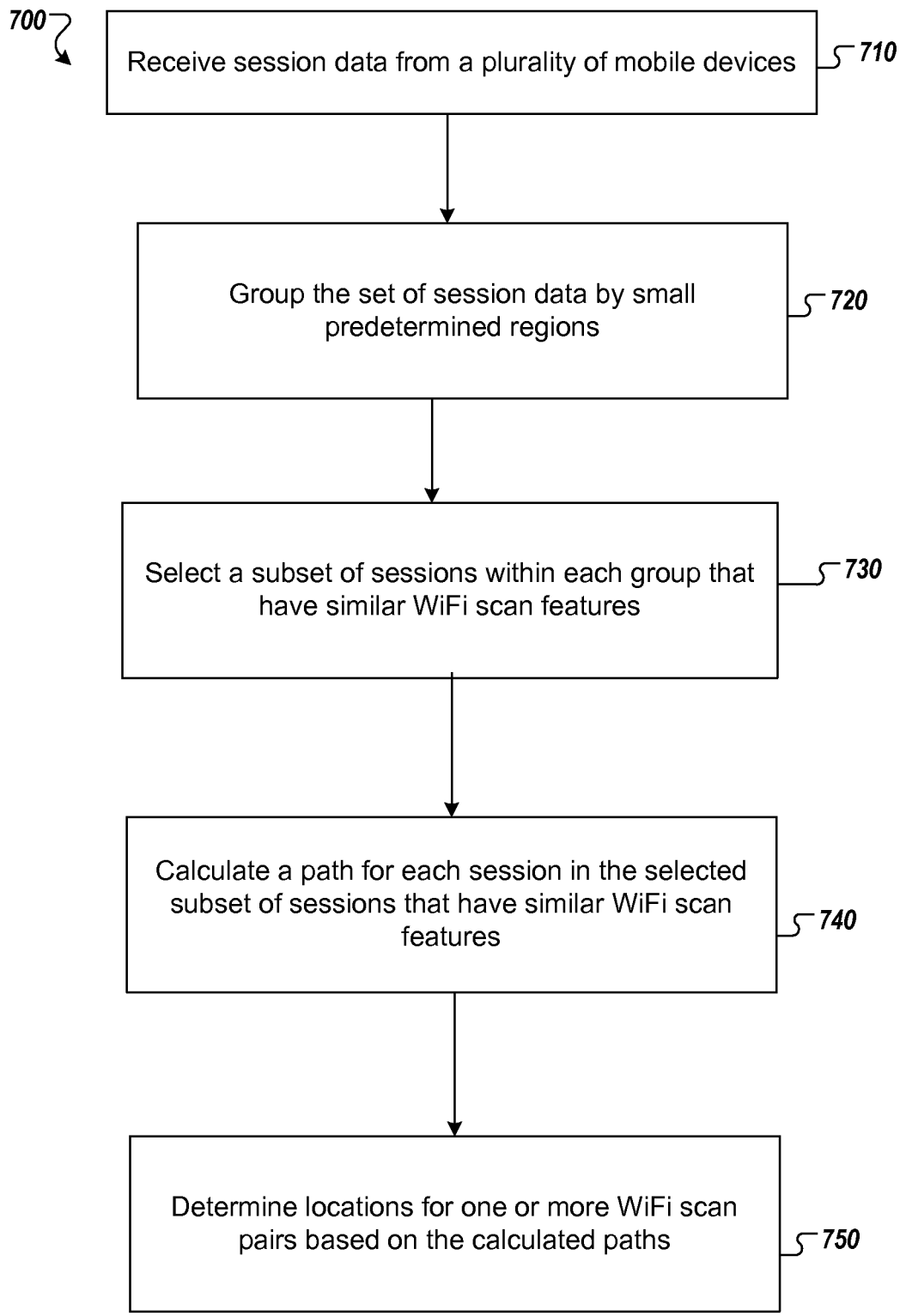
FIG. 7 is a flowchart of another example process for determining WiFi scan or WAP locations using session data received from multiple mobile devices.

FIG. 7 is a flowchart of another example process 700 for determining WiFi scan or WAP locations using session data received from multiple mobile devices. At step 710 session data is received from a plurality of devices. For example, session data may be periodically received from a wide number of mobile devices over a period of a day. The received session data may be gathered, for example stored in a data repository, for later use.

At step 720, a set of session data received at step 710 is grouped by small predetermined regions. Step 720 may be executed by a batch process that analyzes session data gathered over a period of time (e.g., process data gathered every day or every week, etc.) The session data may be filtered for those sessions having activity types that are suitable for path calculations or dead reckoning algorithms, prior to the grouping into small predetermined regions at step 710, see activity recognition module 330 above for more details. The filtering by activity type may, for example, be done at the time sessions are received at step 710, or by the mobile device before transmitting the session data, or may be done in between steps 710 and 720.

At step 730, a subset of sessions having similar WiFi scan features, within each group from step 720, is selected. Session data having similar WiFi scan features are those sessions that pass through roughly the same location, see "Algorithm to extract similar WiFi features from different sessions" above for more details.

At step 740 paths are calculated for the subset of sessions having similar WiFi scan features as determined at step 730. Paths may be calculated by taking a GPS path (determined by a trail of GPS data points in the session data), and determining the rest of the path from where the GPS trail ends, by using gyroscope readings for orientation and step counts (based on accelerometer modulation readings) for distance. A path may be determined for each session data having similar WiFi scan features. The paths may be calculated, as show in process 700, after the selection of a subset of sessions having similar WiFi features or at any other prior point. For example, a path may be calculated by a mobile device and sent along with session data, and precluding the need to calculate a path at step 740.

At step 750, the calculated paths at step 750 are used to determine a latitude and longitude coordinate for the WiFi scan or WAPs within a WiFi scan using the paths calculated at step 740. For example, path data combined with known latitude/longitude coordinates from where the GPS trail ended may be used to calculate a latitude/longitude coordinates along the various steps of the paths. The information for multiple paths may be combined to determine a more accurate latitude/longitude information for a WiFi scan or one or more WAPs in the scan.

The described aspects may help in determining accurate latitude-longitude to WiFi scans. The calculated location as WiFi scan pair information may then be used in addition to GPS data points to better estimate the location of wireless access points. The described functionality may all be used in determining the location of a WAP or may be partially used. For example, activity filtering may or may not be done, combining session data may or may not be done, filtering out paths with too great of an error may or may not be performed. As such, in some implementations, a WAP location may be determined by taking a subset of received session data and calculating a path for the received sessions, calculating a GPS trail/path for the received sessions, aligning the calculated paths using the GPS trails, and determining the location of one or more WAPs using the aligned paths.

The above description uses a walking activity type for step determination, but the described aspects may work well with cars and boats as accurate sensor data may become gatherable from such activities. As such, walking activity is provided as an example, and the scope of this disclosure is not limited to walking activity.

Also, the above examples may provide for taking session data from multiple mobile devices to deduce accurate latitude-longitude pairs for wireless access points, however it may be foreseeable to use the described aspects for a single user's path, along with GPS points, when the predicted accuracy of a single user's path improves with advances in technology. For example, session data received from one mobile device may be used to calculate a path, a GPS trail or path, align the calculated path with the GPS trail, and used the aligned path to determine a location of WAP in the received session data. In some implementations, of using session data gathered and received from a single mobile device, the functionality described for combining sessions may or may not be used.

Aspects of the subject technology involve receiving location information gathered by a mobile device. The gathered location information includes, for example, GPS data points, WiFi scan data, sensor readings, etc. The gathered session data is transmitted to a server to use for WiFi and WAP location calculations. The gathering of location information is known to the user of the mobile device and described in contextual notices provide to the user in plain language, for example, when the user downloads or executes an application. Furthermore, persistent reminders are provided in the user interface of the mobile device that location information is being gathered and transmitted. In some aspects, periodic reminders are provided to the user when the user logs into an application (e.g., every tenth login or every thirty days) or electronic messages (e.g., email) are provided to the user to remind him/her of the gathering of the location information.

The user explicitly and affirmatively provides consent to allowing the gathering of location information, and may easily withdraw or revoke such consent at any time via the user interface of the mobile device. Furthermore, the user may remove any geographic location information associated with the mobile device of the user stored by the service (e.g., in a data repository or a server). In some aspects, a privacy dashboard is provided via the mobile device that allows the user to determine which information about his/her current or past geographic locations is stored by the service or by the mobile device or to remove such information from the service or from the mobile device. Furthermore, all geographic location information is encrypted when transmitted over a network to prevent unauthorized access to the geographic location information.

Figure 8:
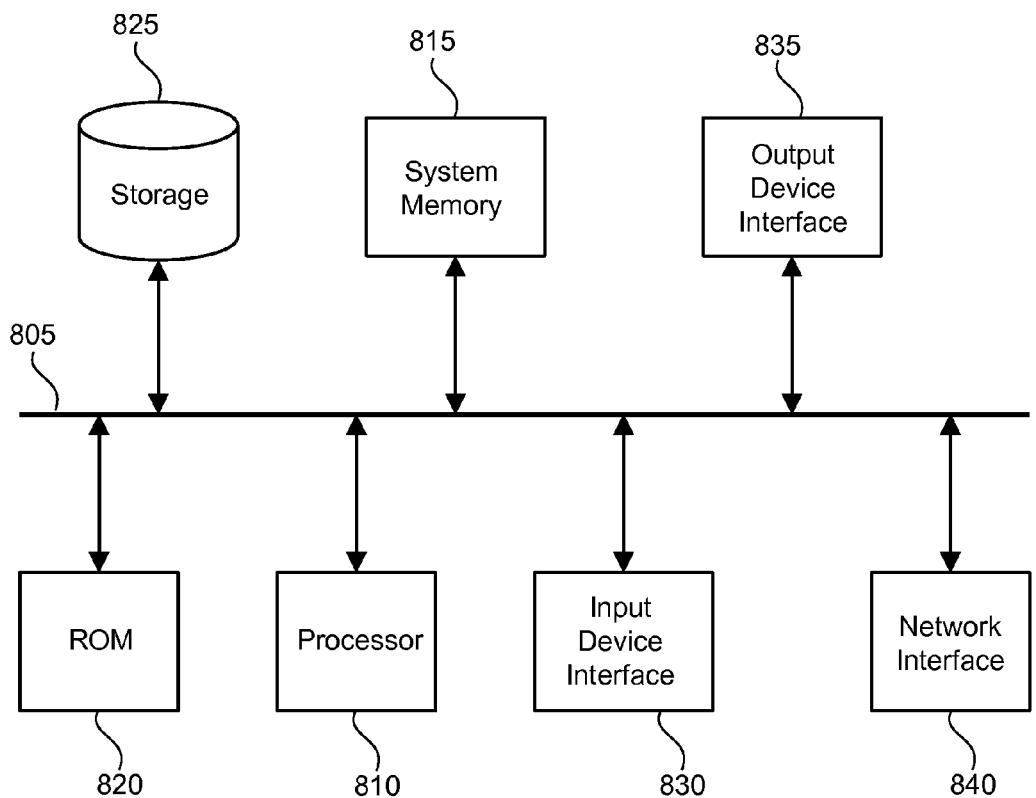
FIG. 8 conceptually illustrates an example electronic system with which some implementations of the subject technology are implemented.

FIG. 8 conceptually illustrates an electronic system 800 with which some implementations of the subject technology are implemented. For example, one or more of the database 110, the server 120, or the mobile device 130 may be implemented using the arrangement of the electronic system 800. The electronic system 800 can be a computer (e.g., a mobile phone, PDA), or any other sort of electronic device. Such an electronic system includes various types of computer readable media and interfaces for various other types of computer readable media. Electronic system 800 includes a bus 805, processing unit(s) 810, a system memory 815, a read-only memory 820, a permanent storage device 825, an input device interface 830, an output device interface 835, and a network interface 840.

The bus 805 collectively represents all system, peripheral, and chipset buses that communicatively connect the numerous internal devices of the electronic system 800. For instance, the bus 805 communicatively connects the processing unit(s) 810 with the read-only memory 820, the system memory 815, and the permanent storage device 825.

From these various memory units, the processing unit(s) 810 retrieves instructions to execute and data to process in order to execute the processes of the subject technology. The processing unit(s) can be a single processor or a multi-core processor in different implementations.

The read-only-memory (ROM) 820 stores static data and instructions that are needed by the processing unit(s) 810 and other modules of the electronic system. The permanent storage device 825, on the other hand, is a read-and-write memory device. This device is a non-volatile memory unit that stores instructions and data even when the electronic system 800 is off. Some implementations of the subject technology use a mass-storage device (for example a magnetic or optical disk and its corresponding disk drive) as the permanent storage device 825.

Other implementations use a removable storage device (for example a floppy disk, flash drive, and its corresponding disk drive) as the permanent storage device 825. Like the permanent storage device 825, the system memory 815 is a read-and-write memory device. However, unlike storage device 825, the system memory 815 is a volatile read-and-write memory, such a random access memory. The system memory 815 stores some of the instructions and data that the processor needs at runtime. In some implementations, the processes of the subject technology are stored in the system memory 815, the permanent storage device 825, or the read-only memory 820. For example, the various memory units include instructions for determining a wireless access point location in accordance with some implementations. From these various memory units, the processing unit(s) 810 retrieves instructions to execute and data to process in order to execute the processes of some implementations.

The bus 805 also connects to the input and output device interfaces 830 and 835. The input device interface 830 enables the user to communicate information and select commands to the electronic system. Input devices used with input device interface 830 include, for example, alphanumeric keyboards and pointing devices (also called "cursor control devices"). Output device interfaces 835 enables, for example, the display of images generated by the electronic system 800. Output devices used with output device interface 835 include, for example, printers and display devices, for example cathode ray tubes (CRT) or liquid crystal displays (LCD). Some implementations include devices for example a touchscreen that functions as both input and output devices.

Finally, as shown in FIG. 8, bus 805 also couples electronic system 800 to a network (not shown) through a network interface 840. In this manner, the electronic system 800 can be a part of a network of computers (for example a local area network ("LAN"), a wide area network ("WAN"), or an Intranet, or a network of networks, for example the Internet. Any or all components of electronic system 800 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A computer-implemented method for determining a wireless access point location, the method comprising:
   receiving, by one or more computing devices, session data from at least one mobile device, wherein each instance of the received session data includes one or more global positioning system (GPS) data points, one or more sensor data points, and one or more WiFi scan data points, wherein the one or more WiFi scan data points are associated with one or more wireless access points (WAPs); and
   calculating, by the one or more computing devices, a location of at least one of the one or more WAPs using at least a portion from each of the received one or more global positioning system (GPS) data points, the one or more sensor data points, and the one or more WiFi scan data points;
   wherein the location of the at least one of the one or more WAPs is calculated based at least in part by calculating a path for each instance of session data in a selected subset of session data, determining which instances of the selected subset of session data have an error greater than a predetermined error threshold based on a distance between the calculated paths for each instance of session data, and filtering out from the selected subset of session data those instances of the selected subset of session data for which the determined error is greater than the predetermined error threshold.

2. The method of claim 1, wherein session data is received periodically from the at least one mobile device for session data gathered periodically by the at least one mobile device.

3. The method of claim 1, wherein the at least one mobile device comprises multiple devices, such that the received session data corresponds to crowd-sourced data.

4. The method of claim 1, further comprising:
   storing the calculated location of the at least one of the one or more WAPs in a location database.

5. The method of claim 1, further comprising:
   determining an activity type for each instance of session data in the selected subset of session data; and
   filtering out from the selected subset of session data those instances of session data that have a determined activity type which is unsuitable for calculating a path.

6. The method of claim 1, wherein the calculating of the path is based on a dead-reckoning algorithm.

7. The method of claim 1, further comprising:
   grouping the selected subset of session data by a geographical region; and
   selecting one group of session data from the grouping for location calculations for WAPs in the geographical region.

8. The method of claim 7, further comprising:
   selecting a first set of WiFi data points from a first session of data in the selected group of session data that have similar WiFi features to a second set of WiFi data points in a second session of data in the selected group of session data, wherein WiFi data points are considered to have similar WiFi features where the two sets of WiFi data points correspond to a similar physical location.

9. The method of claim 8, further comprising:
   determining a location for the first set of WiFi data points having similar WiFi features to the second set of WiFi data points.

10. The method of claim 9, wherein determining the location for the first set of WiFi data points comprises:
    determining latitude and longitude coordinates for a first point having a time stamp immediately before the WiFi scan data point and for a second point having a time stamp immediately after the WiFi scan data point on the calculated path; and
    interpolating latitude and longitude coordinates for the first set of WiFi data points based on the determined latitude and longitude coordinates for the first and second points on the calculated path.

11. The method of claim 10, further comprising:
    using the interpolated latitude and longitude coordinates for the first set of WiFi data points to calculate the location of the at least one of the one or more WAPs.

12. A non-transitory computer-readable medium storing instructions that when executed causes a computer to perform operations for determining location for a WiFi scan, the operations comprising:
    receiving session data from a plurality of mobile devices, wherein each instance of the received session data includes a plurality of global positioning system (GPS)

data points, a plurality of sensor data points, and a plurality of WiFi scans, gathered periodically by the plurality of mobile devices;

selecting, from the received session data, a subset of session data for calculating a location of a WiFi scan; and calculating a location of at least one of the plurality of WiFi scans using the selected subset of session data;

wherein the location of the at least one WiFi scan is calculated based at least in part by calculating a path for one or more instances of session data in selected subset of session data, determining which instances of the selected subset of session data have an error greater than a predetermined error threshold based on a distance between the calculated paths for each instance of session data, and filtering out from the selected subset of session data those instances of the selected subset of session data for which the determined error is greater than the predetermined threshold.

13. The non-transitory computer-readable medium of claim 12, further comprising: storing the calculated location of the at least one of the one or more WiFi scans in a location database.

14. The non-transitory computer-readable medium of claim 12, further comprising: calculating the location of a wireless access point using the calculated location of the at least one or more WiFi scans.

15. The non-transitory computer-readable medium of claim 12, wherein calculating the location of the WiFi scan further comprises:

aligning the calculated paths using received GPS data points; and inferring the location of the at least one or more WiFi scans by determining latitude and longitude coordinates for two points on the calculated paths for one or more instances of session data in the selected subset of session data.

16. A computer-implemented system for determining wireless access point location, the system comprising:

one or more processors;

a memory comprising instructions which, when executed by the one or more processors, cause the one or more processors to:

receive session data from a plurality of mobile devices, wherein the received session data includes a plurality of global positioning system (GPS) data points, a plurality of sensor data points, and a plurality of WiFi scans, gathered periodically by the mobile devices;

group the received session data by small predetermined regions;

select a subset of sessions within one of the groups that have similar WiFi scan features;

calculate a path for each session in the selected subset of sessions; and determine a location for a Win scan within the plurality of WiFi scans based on the calculated paths for the selected subset of sessions;

wherein the location for the WiFi scan is determined based at least in part by determining which sessions in the selected subset of sessions have an error greater than a predetermined error threshold based on a distance between the calculated paths for each session, and filtering out from the selected subset of sessions those sessions in the selected subset of sessions for which the determined error is greater than the predetermined error threshold.

17. The system of claim 16, further comprising:

determine an activity type for each session data in the received set of session data; and filter out some of the received session data based on the determined activity type for that session.

* * * * *